United States Patent [19]

Satou et al.

[11] 4,261,282

[45] Apr. 14, 1981

[54] MOUNTING FOR GEARSHIFT RANGE INDICATING SYSTEM IN AUTOMOTIVE VEHICLES

[75] Inventors: Hiroki Satou; Hakumi Ishii, both of Toyota, Japan

[73] Assignee: Toyota Jidosha Kogyo Kabushiki Kaisha, Aichi, Japan

[21] Appl. No.: 988

[22] Filed: Jan. 4, 1979

[30] Foreign Application Priority Data

Apr. 6, 1978 [JP] Japan .................... 53-39743

[51] Int. Cl.³ .................... G09F 9/00; B62D 1/18
[52] U.S. Cl. .................... 116/28.1; 74/473 SW; 74/493; 116/DIG. 20; 116/278
[58] Field of Search .................... 74/493, 473 SW; 116/28.1, DIG. 20, 278

[56] References Cited

U.S. PATENT DOCUMENTS

| | | | |
|---|---|---|---|
| 3,319,598 | 5/1967 | Lorean | 116/28.1 |
| 3,719,162 | 3/1973 | Herod et al. | 116/28.1 |
| 3,739,741 | 6/1973 | Freyermuth | 116/28.1 |

*Primary Examiner*—Allan D. Herrmann
*Attorney, Agent, or Firm*—Toren, McGeady and Stanger

[57] ABSTRACT

A gearshift range indicating system for indicating the set range of an automatic transmission includes a driving pulley secured on a control shaft of a transmission gear shift unit and a driven pulley rotatably mounted on a steering stem connected with a steering wheel of an automobile. The driving pulley is operably connected to the driven pulley by a cable which enables transmission of rotary motion therebetween while permitting a certain degree of relative displacement between the driven and driving pulleys. An indicator device responsive to rotation of the driven pulley is provided in order to properly indicate the operating range of the automatic transmission in a manner which is free from the influence of change in the relative positioning between the driving pulley and the driven pulley, thereby providing an indicating system well suited for use in automobiles having telescoping and/or tilting steering devices.

4 Claims, 8 Drawing Figures

MOUNTING FOR GEARSHIFT RANGE INDICATING SYSTEM IN AUTOMOTIVE VEHICLES

BACKGROUND OF THE INVENTION

The present invention relates generally to automotive vehicles and more specifically to a mounting system for a gearshift range indicating device for the vehicle. More particularly, the invention is directed toward use with vehicles having automatic transmissions and equipped with telescoping and/or tiltable steering devices.

In conventional automobiles, there is normally provided a shifting unit including a shift lever which is manually operable in order to change the gearshift or operating range of an automatic transmission of the vehicle. The shift lever is normally provided in proximity to the steering wheel and such shift levers are conventionally operatively associated with shifting apparatus which operate to alter the path of hydraulic pressure oil in the hydraulic control system of the automatic transmission. Because of the necessity to provide a visual indication of the set range of the transmission, there arises a need to provide a gearshift range indicating panel in the vicinity of a steering wheel so that it will be clearly visible to the driver of the vehicle.

In conventional systems of the prior art, the gearshift range indicating system which is normally provided includes a pair of pulleys, with one pulley being attached to the shifting unit of the vehicle and with the second pulley having operatively associated therewith a pointer or indicating arm of the visual indicating device. When the transmission is shifted by manual operation of a shift lever, the first pulley is rotated and by means of an endless belt which is operatively engaged about both pulleys, the second pulley is rotated in response to the first pulley thereby to cause motion of the indicating arm or pointer when the gearshift lever is moved to a different set position.

One serious disadvantage of such devices is that no relative displacement between the two pulleys can be tolerated by the system. Thus, in vehicles which are provided with tiltable and/or telescoping steering devices, the conventional prior art approach cannot be used since no relative movement between the pulleys, other than appropriate rotation during gearshifting, can be tolerated.

Accordingly, the present invention is directed toward providing a gearshift range indicating system which will avoid the shortcomings inherent in prior art systems. More specifically, the invention is intended to provide a mounting system for such a gearshift range indicating mechanism which enables utilization of the mechanism with steering systems utilizing telescoping and/or tiltable steering devices. The system of the invention operates to enable changes in the position or attitude of the steering wheel without interference with transmission of rotation between the pulleys of the gearshift range indicating system.

SUMMARY OF THE INVENTION

The invention is particularly intended for use in an automobile having a steering unit which includes a steering stem with a steering wheel connected thereto, the steering unit being mounted with the steering wheel tiltably and telescopicly displaceable. A steering shaft is joined to the steering stem to be rotated by rotation of the steering wheel for steering the vehicle. Automatic transmission means are provided and shift means operating to shift the range of the automatic transmission means are provided to include a shift lever located in proximity to the steerig wheel and enabling manual control of the operating ranges of the transmission and a control shaft rotatable by means of the shift lever. The gearshift range indicating system of the present invention comprises a driving pulley operatively associated with the control shaft of the shift means to be rotatable together therewith during changes in the position of the shift lever whereby the transmission is manually set to a different operating range. A driven pulley is rotatably mounted upon the steering unit and a cable having a pair of ends interconnects the driving pulley and the driven pulley, with one end of the cable being secured to the driving pulley and with the other end of the cable being secured to the driven pulley. The cable is operable to transmit rotary motion between the driving pulley and the driven pulley irrespective of certain changes in the relative positioning or orientation between the pulleys which may particularly occur as a result of tilting or telescopic movement of the steering wheel. Indicator means operatively associated with the driven pulley are provided for accurately indicating the operating range of the transmission means in response to rotation of the driven pulley. Thus, a visual indication of the set range of the transmission may be provided free from the influence of changes occurring in the relative positioning between the driving pulley and the driven pulley which might result from tilting and/or telescopic movement of the steering wheel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
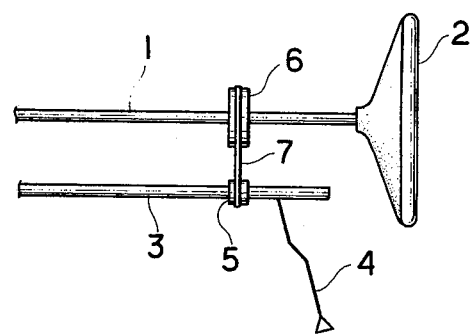
FIGS. 1 and 2 are diagrammatic views illustrating a conventional type of gearshift range indicating system for use in an automobile having an automatic transmission.
Figure 2:
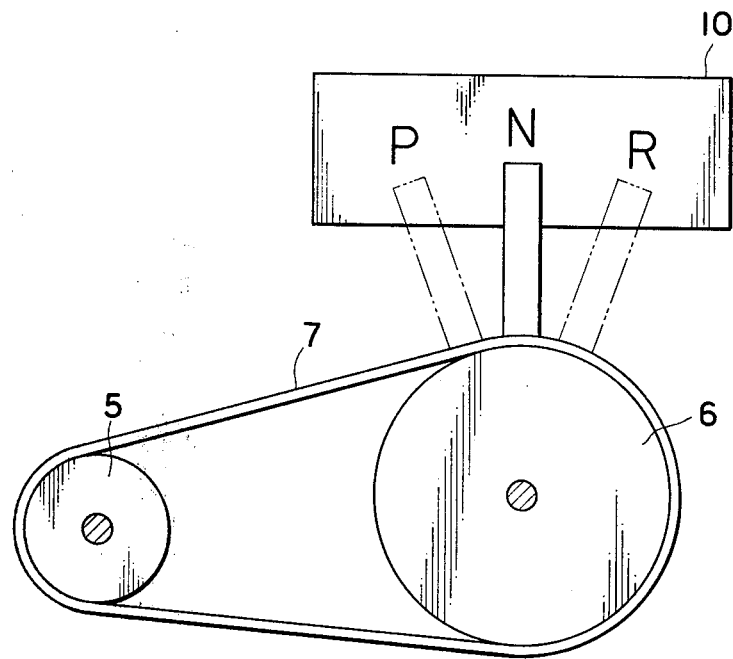

In order to provide a better understanding of the contribution of the present invention it may prove instructive to first consider the structure and operation of gearshift range indicating systems of conventional prior art configuration. Such a conventional prior art gearshift range indicating system is depicted in FIGS. 1 and 2 wherein there is shown a steering shaft 1 rotated by means of a steering wheel 2 so that the rotation of the steering wheel 2 may be transmitted through the steering shaft 1 to steering linkage of an automobile in order to enable changing a direction of the wheels thereof. A control shaft 3 extends in generally parallel adjacent relationship to the steering shaft 1 and a shift lever 4 is positioned in the neighborhood of the steering wheel 2 and is mounted to the control shaft 3. In the operation of the device depicted, a change in the position of the shift lever 4 will operate to transmit motion thereof through the control shaft 3 to a manual valve of a hydraulic control system (not shown) thereby resulting in a change in the path of hydraulic pressure oil through the system in order to determine a set operating range for an automatic transmission. This set operating range may be made dependent upon manual setting of the position of the shift lever 4.

In order to provide a visual indication of the set position of the automatic transmission, the system includes a driving pulley 5 mounted on the control shaft 3 at a given position in order to rotate together with the control shaft 3. A driven pulley is rotatably mounted to the steering shaft 1 at a given position generally within the plane of the driving pulley 5 and an endless belt 7 is trained about the two pulleys 5, 6 in order to transmit rotation of the driving pulley 5 to the driven pulley 6. An indicator panel or board 10 is secured to a tubular column surrounding the steering shaft 1 and it has provided thereon characters or symbols representing the various gearshift positions of the automatic transmission. For example, P represents parking range, N represents neutral range and R represents reverse drive. A pointer or arm 11 is adapted to be moved with rotation of the driven pulley 6 to a different position relative to the panel 10 thereby to indicate the gearshift position of the lever 4 and the operating range of the automatic transmission established thereby.

A gearshift range indicating system of the type described, will, however, not be capable of application to a system wherein the position of the driving pulley is variable relative to the position of the driven pulley, except for the relative rotation therebetween. For example, in the structure described a coupling is provided below the steering shaft 1 so that it becomes impossible to position the lower end of the control shaft 3 obliquely above the steering shaft 1 with the result that, for avoiding interference of the control shaft 3 with the coupling, the lower end of the control shaft 3 must be positioned above the steering shaft 1. In addition, an instrument panel mounting a speedometer and the like is positioned above the upper end of the steering shaft 1 so that the upper end of the control shaft 3 should be positioned obliquely below the steering shaft. As a result, the control shaft 3 extends in an inclined relationship relative to the steering shaft 1. In a situation where there must be provided a telescoping or tiltable steering device, the relative positioning of the driving pulley 6 and the driven pulley 5 must be varied. However, because of the nature of the device difficulties will arise when it is attempted to appropriately vary the positioning of these pulleys to enable tilting and/or telescoping of the steering wheel. One solution which has been suggested is to enable variation in the positioning of the driving pulley 5 relative to the driven pulley 6 by the provision of a universal joint which is built into the control shaft 3. However, since such a universal joint will allow some play, the gearshifting feeling which will be communicated to the driver is likely to be altered or varied in a manner which might impart a feeling of looseness or lack of firmness in the shifting maneuver and thus such an approach is usually not recommended.

The present invention is aimed toward overcoming these shortcomings and toward enabling operation of the gearshift range indicating system with accuracy and reliability without effect or influence from the tilting and/or telescoping action of the steering wheel.

Figure 3:
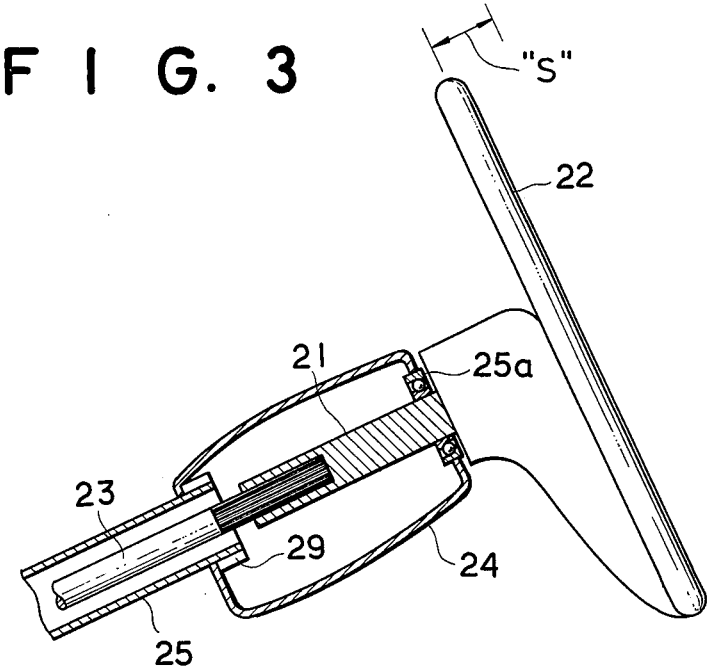
FIG. 3 is a cross sectional view of a conventional type of steering unit for a vehicle having a telescoping steering device.

An understanding of the invention may be provided by reference to FIG. 3, wherein a steering stem 21 is integrally secured to a steering wheel 22, and extends in the axial direction thereof. A steering shaft 23 extends in a coaxial relation to the steering stem 21, and the axial position of the steering shaft 23 is maintained invariable. The lower end of the steering stem 21 is coupled to the upper end of the steering shaft 23 to establish a spline joint, so that the steering stem 21 may be displaced in the axial direction to a given extent. In this manner, rotation of the steering wheel 22 may be carried through the steering stem 21 and steering shaft 23 to steering linkage for the wheels of an automotive vehicle. An upper tubular column 24 is supported on the steering stem 21 through a bearing 25a, and surrounds the steering stem 21. A locking means 29 which may be operated manually, locks or arrests the axial position of the upper column tube 24 relative to a lower column tube 25. In this manner, the axial position of the steering wheel 22 may be changed within a given range "S" so as to allow drivers to position the wheel to suit their builds.

Figure 4:
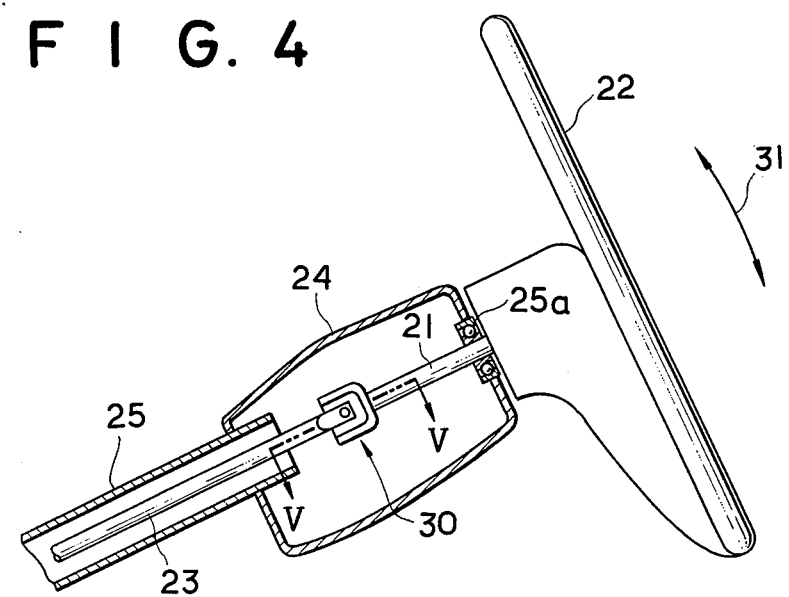
FIG. 4 is a cross sectional view similar to that of FIG. 3 showing a conventional type of steering device capable of being positioned by tilting movement thereof.
Figure 5:
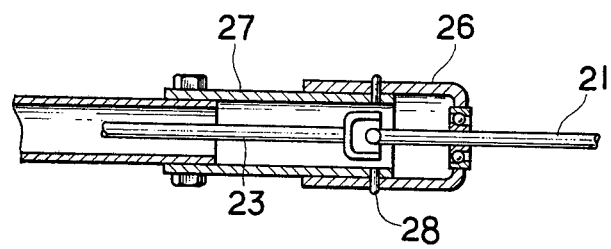
FIG. 5 is a cross sectional view taken along the line V—V of FIG. 4.

Referring to FIGS. 3 and 4, wherein like parts are designated with like reference numerals throughout for avoiding duplicate description, the steering stem 21 is coupled to the steering shaft 23 through the medium of a universal joint 30. As shown in FIG. 5, a rotatable bracket 26 which is rotatably supported on the steering stem 21 through the medium of a bearing is secured to a stationary bracket 27 by means of pins 28, while a manual locking means (not shown) is provided so as to rigidly couple the rotatable bracket 26 to the stationary bracket 27. In this manner, the steering wheel 22 may be rotated in a given angular range 31 in a plane including the steering wheel or a plane vertical to the steering stem 21. The tilt of the steering wheel 22 may be adjusted, commensurate with the driver's build.

Figure 6:
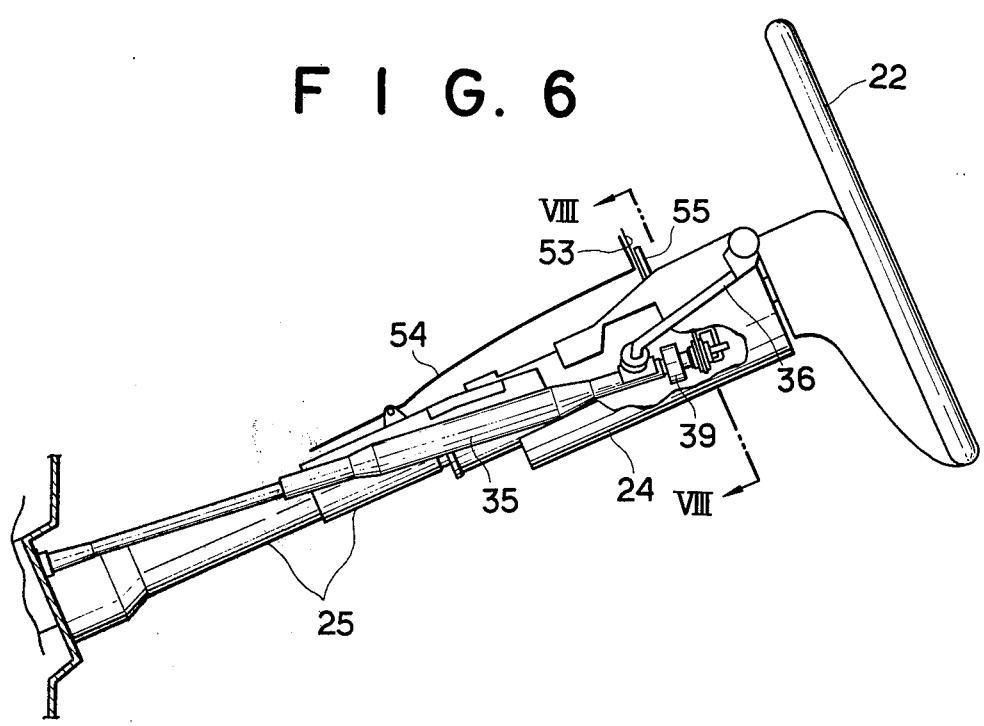
FIG. 6 is a side view of a gearshift range indicating system in accordance with one embodiment of the present invention.
Figure 7:
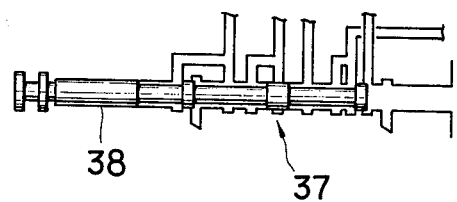
FIG. 7 is a diagrammatic view of a manual valve for use in the hydraulic control system of an automatic transmission of the type with which the present invention may be utilized.

FIG. 6 shows one embodiment of the gearshift range indicating system according to the present invention. In FIG. 6, like parts are designated with like reference numerals as in the case of FIGS. 3 and 4, for avoiding duplicate description. A control shaft 35 extends substantially along the length of the tubular column 25 in the neighborhood thereof. The upper end of the control shaft extends into the upper tubular column 24 to some extent. The shift lever 36 is used for changing the shift positions of the automatic transmission from one to another, and positioned in the vicinity of the steering wheel 22, while being secured to the upper end of the control shaft 35. The operation of the shift lever 36 is transmitted through the control shaft 35 to a manual valve 37 (shown in FIG. 7) in a known type hydraulic control system, so that the axial position of a spool 38 in the manual valve 37 is changed in order to effect changeover of the oil path from one path to another.

Figure 8:
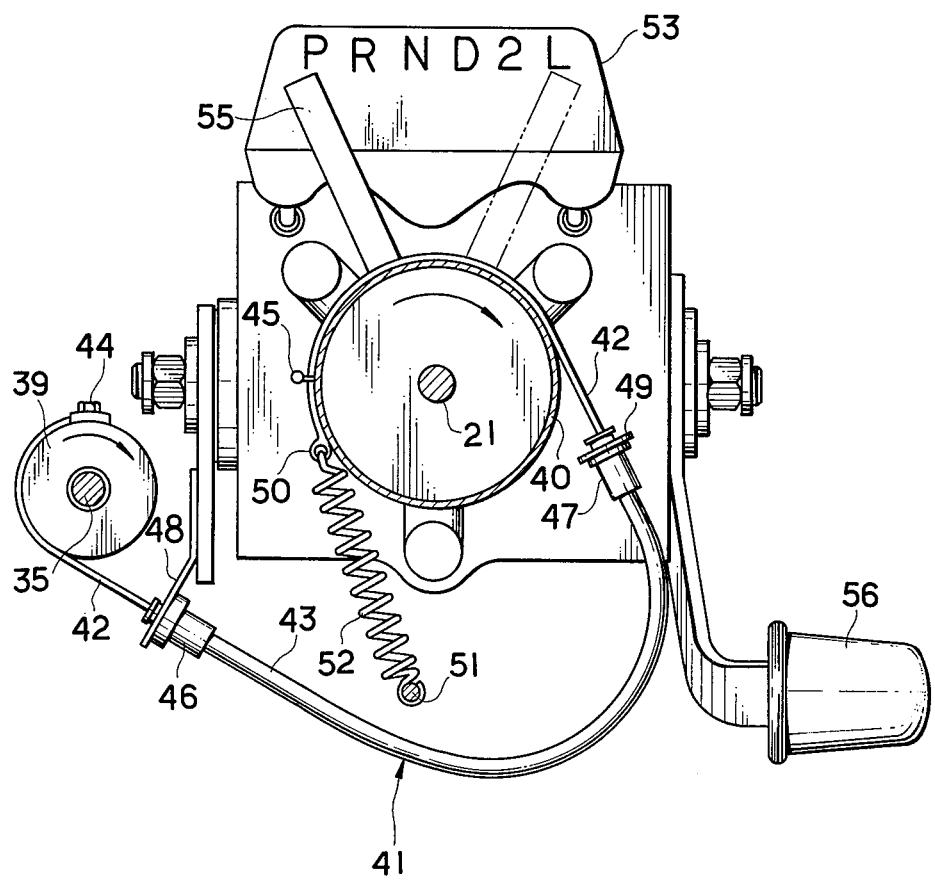
FIG. 8 is a cross sectional view taken along the line VIII of FIG. 6.

As shown in FIG. 8, a driving pulley 39 is secured on the control shaft 35, and rotated together with the control shaft 35. A driven pulley 40 is supported on the upper tubular column 24 in a rotatable manner together therewith. A bulkhead cable 41 includes a wire 42 and a sheath 43. The wire 42 is secured, at its one end, to the periphery of the driving pulley 39 in a given position thereon by means of a bolt 44, as well as to the periphery of the driven pulley 40 in a given position thereon by means of a bolt 45 at the other end thereof. The sheath 43 is secured to a mounting bracket 48 with the lower tubular column 25 at one end 46, as well as to a portion 49 integral with the upper tubular column 24 at the other end 47 thereof. A tension spring 52 is positioned between an end 50 of the wire 42 on the side of the driven pulley 40 and a portion 51 integral with the upper tubular column 24. Marked on an indicating board 43 are characters or symbols representing the gearshift ranges in the automatic transmission, such as P representing parking range, R representing reverse range, N representing neutral range, D representing drive range, 2 representing second range, and L representing low range. The board 53 is secured to the upper tubular column 24 as shown in FIG. 6. A dash panel 54 is integrally secured to the lower tubular column 25. A pointer 55 is secured to the driven pulley 40 at the lower end of the pointer 55, and rotated together with the driven pulley 40. Meanwhile, a steering tilt lever 56 manually operates a locking means which locks or arrests the axial motion or inclined motion of the upper tubular column 24 relative to the lower column tube 25.

Still referring to FIG. 8, when the control shaft 35 is rotated clockwise by means of the shift lever 36, the wire 42 moves outwardly from the end 46 of the sheath 43, while the wire 42 is drawn into the sheath 43 from the other end 47 thereof, with the result that the driven pully 40 is rotated clockwise against the action of the tension spring 52. In this manner, the tip of the pointer 55 indicates a character or symbol representing the gearshift range governed by the position of the shift lever 36.

When the control shaft 35 is rotated counterclockwise by movement of the shift lever 36, the driven pulley 40 is rotated counterclockwise under the action of the tension spring 52, so that the tip of the pointer 55 shifts to the character P.

In case the inclination or tilt angle, or the axial position of the steering wheel 22 is varied, so that the position of the upper tubular column 24 relative to that of the lower tubular column 25 is varied, thereby varying the position of the driven pulley 40 relative to the control shaft 35, the sheath 43 for the bulkhead cable 41 will only be suitably deformed or bent. More particularly, the sheath 43 is bent, with the opposite ends 46, 47 of the sheath 43 being secured to the portions 48, 49 which are integral with the lower tubular column 25 and the upper tubular column 24, respectively. In the same manner as with the steering wheel positioned prior to a change in position of the upper tubular column 24 relative to the lower column tube 25, the pointer 55 may continue indicating the shift position or range position governed by the shift lever 36, without difficulty even in the position of the steering wheel after the change in position of the tube 24 relative to the tube 25.

Thus, when the driven pulley 40 is moved out of the plane of the pulley 39 or is tilted relative thereto as a result of telescopic or tilting movement of the steering wheel the flexible cable and sheath 42, 41 will merely flex in response to such movement without impairing the ability to transmit rotary motion between the pulleys.

As is apparent from the foregoing description of the gearshift range indicating system according to the present invention, the driving pulley 39 is operably connected to the driven pulley 40 by means of the cable 41, thereby allowing the application of the system according to the present invention to a telescoping steering device or a tilt steering device or the combination thereof, in which the steering shaft 23 does not extend in parallel with the control shaft, so that there is eliminated the necessity for maintaining the relative position of the driving pulley 39 to the driven pulley 40 constant.

While a specific embodiment of the invention has been shown and described in detail to illustrate the application of the inventive principles, it will be understood that the invention may be embodied otherwise without departing from such principles.

What is claimed is:

1. In an automobile having a steering system including a steering wheel for steering said automobile, said steering system being composed of an upper steering column and a lower steering column, said steering wheel being mounted upon said upper steering column and being movable for tilting motion by tilting movement of said upper steering column relative to said lower steering column and for telescopic movement by telescopic displacement of said upper steering column relative to said lower steering column; transmission means; and shift means including a shift lever located in proximity to said steering wheel for manually shifting the operating range of said transmission; said gearshift indicating system comprising: a driving pulley operatively associated with said shift means and rotatably positionable in accordance with said operating range of said transmission; a driven pulley; flexible cable means operatively interconnecting said driving pulley and said driven pulley to enable rotary motion of said driving pulley to be transmitted to said driven pulley, said flexible cable means comprising a flexible sheath and a cable movably extending within said sheath, said cable having one end attached to said driving pulley and its other end attached to said driven pulley, said flexible sheath having one end attached to said lower steering column and its opposite end attached to said upper steering column; and indicator means operatively associated with said driven pulley and positionable in response to rotation thereof to provide a visual indication of the set position of said transmission means.

2. In an automobile having a steering unit including a steering stem with a steering wheel connected thereto, said steering unit being mounted with said steering wheel tiltably or telescopically displaceable; a steering shaft joined to said steering stem to be rotated by rotation of said steering wheel for steering said automobile; automatic transmission means; and shift means for shifting the operating range of said automatic transmission means, said shift means including a shift lever located in proximity to said steering wheel enabling manual control of the operating ranges thereof and a control shaft rotatable by means of said shift lever; a gearshift range indicating system comprising: a driving pulley operatively associated with said control shaft and rotatable together therewith; a driven pulley rotatably mounted on said steering unit; a cable having a pair of ends, with one of said ends secured to said driving pulley and with the other of said ends secured to said driving pulley, said cable being operable to transmit rotary motion of said driving pulley to said driven pulley despite changes in relative positioning between said pulleys; and indicator means operatively associated with said driven pulley for accurately indicating the operating range of said transmission means in response to rotation of said driven pulley free from the influence of changes occurring in the relative positioning between said driving pulley and said driven pulley resulting from tilting or telescopic movement of said steering wheel.

3. A system according to claim 2 wherein said steering stem is coupled with said steering shaft in telescopic relationship.

4. A system according to claim 2 wherein said steering wheel and said steering stem are mounted to be tilted relative to said steering shaft thereby to accommodate in said automobile drivers of different physical size.

* * * * *